United States Patent
Farrell et al.

(10) Patent No.: US 9,215,425 B1
(45) Date of Patent: Dec. 15, 2015

(54) CAMERA-AIDED FOCUSING IN OPTICAL METROLOGY

(71) Applicants: Colin Farrell, Tucson, AZ (US); Jan van Burken, Tucson, AZ (US)

(72) Inventors: Colin Farrell, Tucson, AZ (US); Jan van Burken, Tucson, AZ (US)

(73) Assignee: BRUKER NANO INC., Santa Barbara, CA (US)

( * ) Notice: Subject to any disclaimer, the term of this patent is extended or adjusted under 35 U.S.C. 154(b) by 453 days.

(21) Appl. No.: 13/758,912

(22) Filed: Feb. 4, 2013

(51) Int. Cl.
*H04N 7/18* (2006.01)

(52) U.S. Cl.
CPC .................................. *H04N 7/18* (2013.01)

(58) Field of Classification Search
CPC ...... G02B 21/365; G01J 3/45; G01N 21/8806; G01N 21/9501; H04N 7/183
USPC ........ 348/79, 87, 92, 125, 126, 128; 356/456, 356/497, 511; 382/145
See application file for complete search history.

(56) References Cited

U.S. PATENT DOCUMENTS

| | | | | |
|---|---|---|---|---|
| 5,112,129 A | * | 5/1992 | Davidson et al. | 356/497 |
| 5,194,912 A | * | 3/1993 | Batchelder | B82Y 15/00 356/301 |
| 5,194,918 A | * | 3/1993 | Kino et al. | 356/497 |
| 5,220,403 A | * | 6/1993 | Batchelder | G01N 21/9505 250/358.1 |
| 5,398,113 A | * | 3/1995 | de Groot | 356/497 |
| 5,943,134 A | * | 8/1999 | Yamaguchi et al. | 356/503 |
| 6,734,967 B1 | * | 5/2004 | Piwonka-Corle | G01N 21/211 356/369 |
| 7,884,947 B2 | * | 2/2011 | De Lega et al. | 356/511 |
| 2001/0049589 A1 | * | 12/2001 | Yasuda et al. | 702/150 |
| 2002/0148955 A1 | * | 10/2002 | Hill | 250/234 |
| 2007/0046948 A1 | * | 3/2007 | Podoleanu et al. | 356/497 |
| 2008/0013073 A1 | * | 1/2008 | Kobayashi et al. | 356/73 |
| 2010/0328445 A1 | * | 12/2010 | Oshiro | G02B 21/245 348/79 |
| 2011/0075928 A1 | * | 3/2011 | Jeong et al. | 382/181 |
| 2012/0002031 A1 | * | 1/2012 | Pertsinidis et al. | 348/79 |
| 2012/0154819 A1 | * | 6/2012 | Cobb | G01B 11/2441 356/513 |
| 2013/0286182 A1 | * | 10/2013 | Dake | G02B 3/0056 348/79 |

* cited by examiner

*Primary Examiner* — Victor Kostak
(74) *Attorney, Agent, or Firm* — Antonio R. Durando

(57) ABSTRACT

A side camera is combined with a conventional optical metrology system to image the object during the focusing scan performed in normal focusing procedures. The camera is positioned in fixed spatial relation to the objective and with its focal plane in substantial alignment with the optical axis of the objective so as to image the object during the scan. The camera is used to monitor the illumination spot formed on the object by the beam projected through the system's objective. The in-focus position is found by moving the object such that the illumination spot coincides with the objective's focus seen through the camera.

20 Claims, 3 Drawing Sheets

CAMERA-AIDED FOCUSING IN OPTICAL METROLOGY

BACKGROUND OF THE INVENTION

1. Field of the Invention

This invention pertains to the general field of optical metrology. In particular, the invention relates to a method for materially increasing the speed of focusing in optical profilometry.

2. Description of the Prior Art

Various optical systems and techniques are known to map the height of a sample surface. These include, without limitation, low-coherence interferometry, confocal microscopy, bright-field and dark-field microscopy (image sharpness techniques), and structured light techniques. These methods are all encompassed by what is generally referred to in the art, interchangeably, as optical metrology, optical profilometry, or 3-D microscopy. In the case of low-coherence interferometry (including structured light metrology), the optical signal captured by the system is fringes that yield a process signal referred to as modulation. In the case of confocal microscopy, the optical signal is irradiance that is typically processed as such. In the case of bright-field and dark-field microscopy, the optical signal is irradiance that is normally processed in terms of its standard deviation within neighboring pixels.

In all of these techniques the measurement procedure requires the sample surface to be in focus with the objective of the measuring instrument, that is, at a fixed focal distance from the objective. The in-focus position is normally found by scanning the object through the focal point of the objective while monitoring the light signal detected through the objective lens. As the sample surface approaches the focal point, the signal becomes stronger and the focal position is thus established for the measurement. For example, in the case of interferometric measurements that produce modulated interference fringes during the scan, the focal position is found by determining the point of maximum modulation.

A major drawback of this through-focus scanning approach is the fact that it requires a scan covering the entire span of height variations in the sample surface, which may be in the order of millimeters and therefore require a starting point that is significantly distant from the in-focus position. This need to scan through the entire height span is a time consuming operation that greatly slows down the measurement. In interferometric profilometry this problem is often attenuated by first performing a faster low-magnification scan to find the approximate in-focus position, and then by performing a local through-focus scan at a higher magnification to refine the in-focus placement of the sample for performing the measurement. However, this approach still requires an initial scan through the entire height range of the sample with its attendant time requirements.

Another problem lies in the fact that, because the light signal seen through the objective is strong only when the sample surface is in the vicinity of the focal point, unless the focusing scan happens to start close to focus, it is normally necessary to scan through a significant distance just to establish in which direction the scan needs to move in order to find the in-focus position. This means that the initial focusing scan normally performed in the art is equally likely to move in the wrong as in the right direction. This is particularly crucial when objectives with a short working distance are used because, unless particular attention is paid, the objective may inadvertently crash into the sample while searching for the focus position.

These problems are especially severe when automatic focusing mechanisms and algorithms are used, which is the norm when optical profilometry is used for quality control purposes. Any improvement that accelerates the speed of measurement and decreases the chances of the objective crashing into the sample is a welcome step forward in the art. This invention achieves both of these objectives.

SUMMARY OF THE INVENTION

The invention is based on the idea of combining a side camera with a conventional optical metrology system to image the object during the focusing scan performed in normal focusing procedures. The camera is positioned in fixed spatial relation to the system's objective and with its focal plane sufficiently aligned with the optical axis of the objective to allow imaging of the object through the entire scan. The camera is used to monitor the illumination spot formed on the object by the beam projected through the system's objective. The in-focus position is readily found with reference to the objective lens' focal point as seen through the camera.

The focusing procedure can be carried out manually by observing the spot on a computer monitor showing the virtual position of the objective's focal point with a target indicator on the image. The position of the sample relative to the objective can thus be controlled so as to bring the illumination spot on the object to coincide with the target. Depending on the position of the illumination spot seen on the monitor with respect to the target, the position of the object being measured in relation to the focal point of the objective is readily ascertained and the scanning mechanism can be operated accordingly to bring the object into focus.

Preferably, a computer is used to automate the focusing operation. The processor is programmed to identify the position of the illumination spot in relation to the focal point of the objective (and the target) and to control the scanning mechanism so as to move the spot toward the focal point (and the target) until it coincides with it in the camera image. The computer is also programmed to stop actuation of the scanning mechanism when the objective approaches the surface of the sample in order to avoid contact and damage to the objective.

Various other features and advantages will become clear from the description of the invention in the specification that follows and from the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

The goal of a focusing mechanism is to position the surface of the sample being measured exactly at the focal point of the objective of the measurement instrument. Since the focal point is at a fixed distance from the objective (its focal length), its position relative to the objective is always known, and the distance of the focal point from the stage can also be known simply by calibrating the scanning positions of the instrument. However, the position of the surface of the sample relative to the objective's focal point cannot be ascertained without also knowing the thickness of the sample and the height map of its surface (in essence, the exact position of the surface point being measured that lies between the supporting stage and the objective). As a result, the sample is mounted on the stage and the in-focus position is normally determined with a through-focus scan, as described above. If the in-focus position of the sample is not found from the light signal transmitted through the objective while scanning in one direction, the scan is repeated in the opposite direction until a strong signal is detected that indicates that the sample is near focus.

Figure 1:
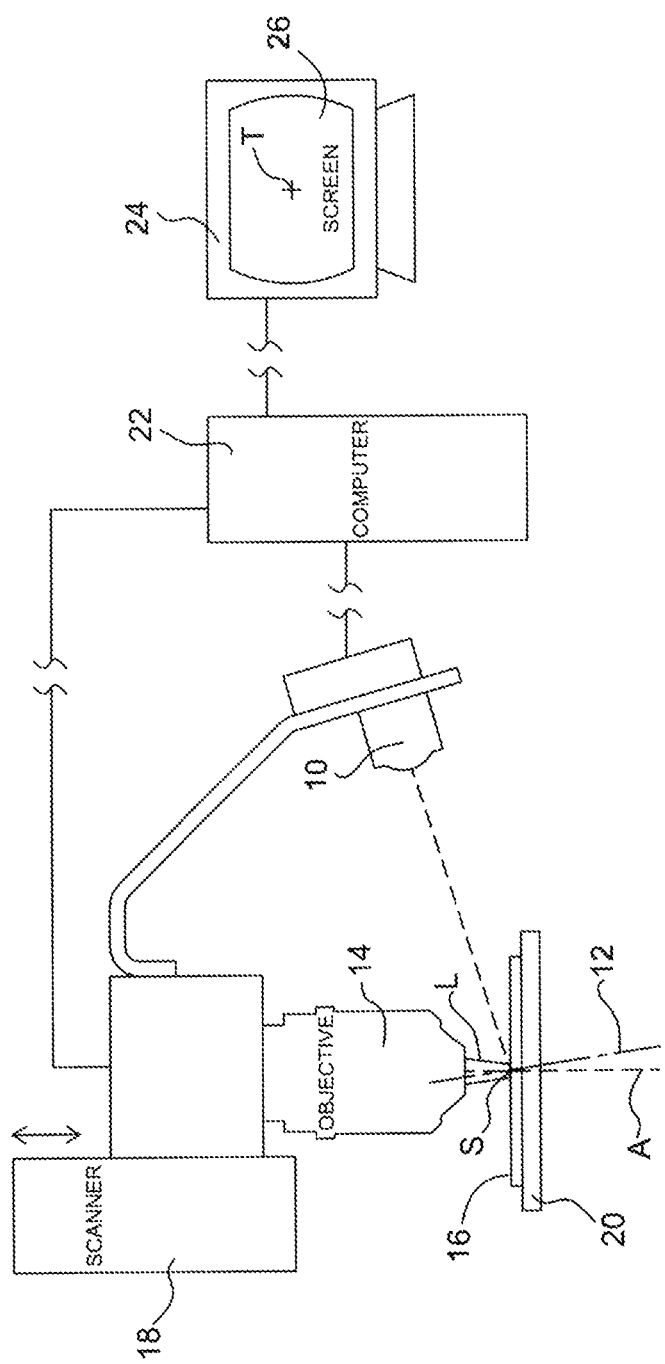
FIG. 1 is a schematic illustration of the optical metrology apparatus of the invention.
Figure 2:
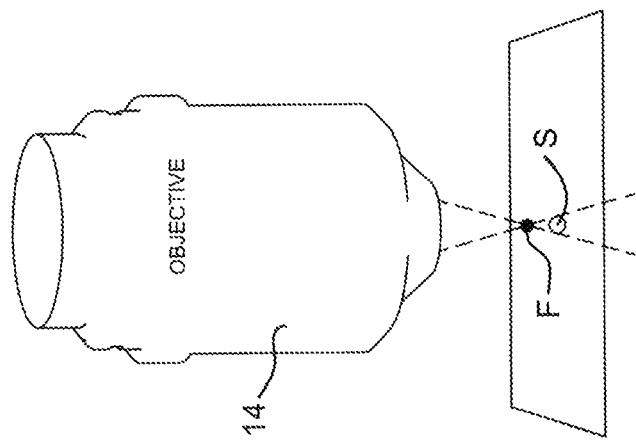
FIG. 2 illustrates a sample surface positioned in focus with respect to the objective shown in FIG. 1.
Figure 3:
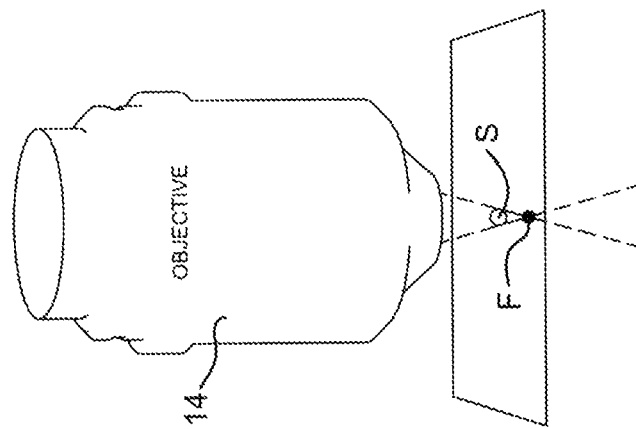
FIG. 3 illustrates a sample surface positioned above the focal point of the objective shown in FIG. 1.
Figure 4:
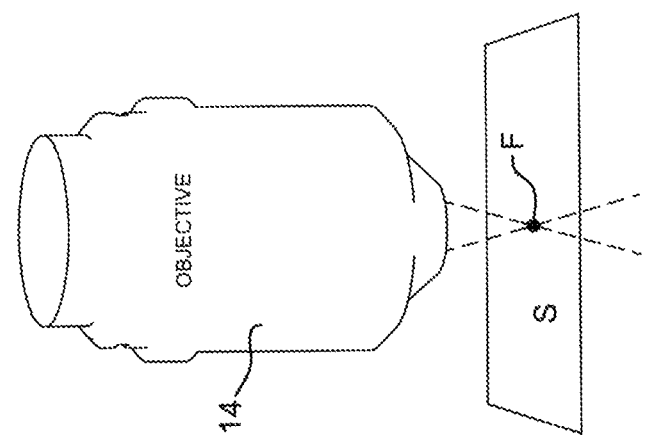
FIG. 4 illustrates a sample surface positioned below the focal point of the objective shown in FIG. 1.

The invention is based on the idea of using a separate camera rigidly attached to the objective (so that they move together) to monitor the light reflected by the sample surface. The term objective is used herein to refer to the optical assembly used to image the sample in a measurement system for optical metrology; the optical assembly may include a single lens or a combination of lenses and/or other optical elements. As illustrated in FIG. 1, by positioning a camera 10 such that its focal plane 12 is nearly parallel to and substantially aligned with the optical axis A of the measurement instrument's objective 14, the camera can see the portion of the sample surface 16 illuminated by the measuring beam L throughout all positions assumed by the sample stage during the focusing scan. (Note that a slight angle with respect to perfect parallelism is necessary for the camera to see the surface of the sample.) A scanning mechanism 18 is provided to move the objective 14 in relation to the sample stage 20 (or vice versa), thereby effecting the focusing scan. As one skilled in the art will readily appreciate, the camera used for this purpose will need to have an appropriate depth of field to ensure that the light reflected from the sample surface is at all times imaged with acceptable sharpness. For example, a camera with an F number greater than 2, positioned with its optical axis at about 10 degrees in relation to the objective's optical axis, is suitable for imaging the sample surface over the entire field of view of the camera (which of course is positioned as needed to see the sample during the focusing scan operation). The illumination spot S on the sample surface will coincide with the objective's focal point F when the surface is in focus (as illustrated in FIG. 2) and will be either above or below the focal point if the sample is away from focus on either side of the focal point F (FIGS. 3 and 4). Thus, the use of the camera 10 enables the immediate determination of the sample position relative to focus.

The position of the light spot S viewed by the camera 10 can be detected and monitored optically in conventional manner, either visually or electronically, such as by tracking the light irradiance received in image space from the area neighboring the camera's focal point. Appropriate software can be used with a computer 22 to determine the position of the spot seen within the focal plane 12 of the camera 10 as the distance between the stage 18 and the objective 14 is varied during the focusing operation. A monitor 24 can also be provided for a user to monitor the spot visually and to control the focusing scan manually, if desired.

Figure 5:
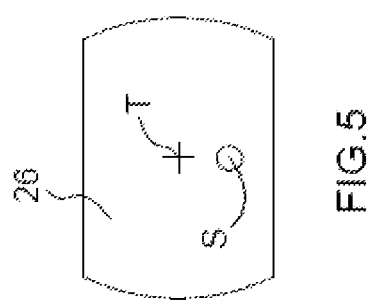
FIG. 5 shows the image shown on the monitor of the invention under the conditions of FIG. 4.

Because the camera 10 must necessarily be in fixed spatial relation to the objective 14, the position of the focal point F within the image captured by the camera is also fixed. Therefore, once the spot S is initially imaged by the camera, it will be immediately apparent whether it is above or below the focal point F and the focusing scan can be initiated in the right direction from the start. This determination can be done in software simply by associating the focal point of the objective with the camera pixels aligned with it in image space. The same can be achieved for manual operation by showing a target T corresponding to the virtual image of the objective's focal point F on the screen 26 of the monitor 24. Thus, the user would know immediately the position of the sample by whether the illumination spot S were above or below the target T, as illustrated in FIGS. 4 and 5. For some applications it may be preferable to set the target in the neighborhood of the exact focal point (slightly above or below) in order to scan through focus as may be required for a measurement or for additional fine focusing steps.

For automatic operation, the system is preferably calibrated so as to enable the direct movement of the sample stage toward focus by the correct amount required to place the illumination spot at the focal point. This can be done by first bringing a sample into focus of the objective using one of the methods described in prior art and recording the position of the illumination spot in image space, as viewed through the camera. Then the scanning mechanism is operated to produce a known displacement above focus along the optical axis of the objective and the position of the illumination spot is recorded. The operation is repeated by a known displacement below focus and again the position of the spot is recorded. By calculating the ratio of the known displacements along the objective's axis to the spot movements in image space as recorded by the camera, the scanner-versus-image displacement is established for the system. Since the relation is necessarily linear, the system so calibrated can automatically determine the scanning distance required to move the illumination spot to focus from the location where it is initially detected by the camera.

The focusing process of the invention can be used in the same manner regardless of the particular method of optical metrology adopted for the measurement. Because samples are typically measured at various surface locations that may have a significant height difference, once the in-focus position is found for the first measurement, the invention can be used advantageously to process a continuous stream of images as the part is moved under the microscope. By monitoring the position of the illumination spot S reflected in this sequence of images, the focusing mechanism can be activated contemporaneously to keep the sample surface in focus as it is being translated from point to point for successive measurements. Moreover, such nominal focus positions can be recorded to create a map for later use with a similar part.

Thus, a simple apparatus and method have been disclosed that materially improve the process of implementing all types of focusing systems used in the art of optical metrology to position a sample in focus with respect to a measuring objective. The invention materially reduces the time required to find focus and it is particularly useful when the height of the sample varies considerably across the sample surface. The correct direction of scan is determined from the beginning, thereby eliminating the occasional need to change direction and avoiding objective crashes resulting from initial scans in the wrong direction. Furthermore, simply by deactivating the scanning mechanism when to objective reaches a predetermined minimum safety distance from the sample stage (and therefore also a corresponding distance from the surface of the sample intended to be measured), the objective is prevented from crashing into the sample and causing damage to the system or the sample. This is preferably accomplished in software so as to stop scanning at that point, whether the scanning mechanism is being controlled manually or automatically.

Various changes in by controlling the scanning mechanism the details that have been described may be made by those skilled in the art within the principles and scope of the invention herein illustrated and defined in the appended claims. For example, a charge-coupled device (CCD) line camera could be used instead of a conventional array camera or other position sensitive device so long as the line detector were aligned with the axis of the system's objective. Thus, while the invention has been shown and described in what are believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

What is claimed is:

1. Focusing apparatus in a measurement system for optical metrology wherein optical measurement signals are detected by a measurement detector through a measurement optical assembly, comprising:
   a measurement optical assembly with a focal point along an optical axis thereof;
   a stage adapted to receive a sample;
   a scanning mechanism for effecting a focusing scan by varying a distance between the sample and the measurement optical assembly; and
   a side camera; said camera being in addition to the measurement detector of the system and having an optical axis positioned at an angle in relation to the optical axis of the measurement optical assembly so as to image an illumination spot produced on the sample during said focusing scan.

2. The apparatus of claim 1, further including a computer programmed to identify said illumination spot detected by the camera, said spot being generated on the sample by a light beam projected along said optical axis of the measurement optical assembly.

3. The apparatus of claim 2, wherein said computer is further programmed to determine a position of the illumination spot in relation to the focal point of the measurement optical assembly and to control the scanning mechanism so as to move the spot toward the focal point.

4. The apparatus of claim 3, wherein said computer is further programmed to stop actuation of the scanning mechanism when said distance between the sample and the measurement optical assembly is equal to a predetermined minimum safety distance.

5. The apparatus of claim 2, further including a monitor to display an image of the spot on the sample.

6. The apparatus of claim 5, wherein said monitor also displays a target representing a virtual position of the measurement optical assembly's focal point in relation to the illumination spot.

7. The apparatus of claim 1, wherein said measurement system is an interferometer.

8. The apparatus of claim 1, wherein said measurement system is a confocal microscope.

9. The apparatus of claim 1, wherein said measurement system is a bright-field microscope.

10. The apparatus of claim 1, wherein said camera is a position sensitive device.

11. A method of focusing a sample in a measurement system for optical metrology wherein optical measurement signals are detected by a measurement detector through a measurement optical assembly, comprising the following steps:
    providing a measurement optical assembly with a focal point along an optical axis thereof, a stage adapted to receive a sample, a scanning mechanism for effecting a sample scan by varying a distance between the sample and the measurement optical assembly, and a camera, said camera being in addition to the measurement detector of the system and having an optical axis positioned at an angle in relation to the optical axis of the measurement optical assembly so as to detect an illumination spot produced on the sample during said focusing scan; and
    operating the scanning mechanism to vary said distance between the sample and the measurement optical assembly along said optical axis thereof so as to move said illumination spot detected by the camera toward said focal point, said spot being generated on the sample by a light beam projected along the optical axis of the measurement optical assembly.

12. The method of claim 11, wherein said step of operating the scanning mechanism is controlled by a computer.

13. The method of claim 12, wherein said computer is programmed to identify a position of the illumination spot in relation to the focal point of the measurement optical assembly and to control the scanning mechanism so as to move the spot toward the focal point.

14. The method of claim 13, wherein said computer is further programmed to stop actuation of the scanning mechanism when said distance between the sample and the measurement optical assembly is equal to a predetermined minimum safety distance.

15. The method of claim 12, further including a monitor to display an image of the spot on the sample.

16. The method of claim 15, wherein said monitor also displays a target representing a virtual position of the measurement optical assembly's focal point in relation to the illumination spot.

17. The method of claim 11, wherein said measurement system is an interferometer.

18. The method of claim 11, wherein said measurement system is a confocal microscope.

19. The method of claim 11, wherein said measurement system is a bright-field microscope.

20. The method of claim 11, wherein said camera is a position sensitive device.

* * * * *